United States Patent [19]

Rockwell

[11] Patent Number: 4,532,376
[45] Date of Patent: Jul. 30, 1985

[54] ELECTRONIC PEN WITH SWITCHING MECHANISM FOR SELECTIVELY PROVIDING TACTILE OR NON-TACTILE FEEL

[75] Inventor: Lynn H. Rockwell, Mesa, Ariz.

[73] Assignee: Sanders Associates, Inc., Nashua, N.J.

[21] Appl. No.: 518,726

[22] Filed: Jul. 29, 1983

Related U.S. Application Data

[63] Continuation-in-part of Ser. No. 498,602, May 26, 1983, abandoned.

[51] Int. Cl.³ .............................................. G08B 5/22
[52] U.S. Cl. ..................................................... 178/18
[58] Field of Search ............................ 178/18, 19, 20; 200/159 B, 73

[56] References Cited

U.S. PATENT DOCUMENTS

| | | | |
|---|---|---|---|
| 2,262,777 | 11/1941 | Roper | 200/159 B |
| 3,600,528 | 8/1971 | Leposavic | 200/5 |
| 3,643,041 | 2/1972 | Jackson | 200/5 A |
| 3,751,612 | 8/1973 | Hansen | 200/52 |
| 3,879,593 | 4/1975 | Larson | 200/159 B |
| 3,886,311 | 5/1975 | Rodgers et al. | 178/18 |
| 3,908,109 | 9/1975 | Studebaker | 200/275 |
| 4,034,155 | 7/1977 | Muller et al. | 178/19 |
| 4,127,752 | 11/1978 | Lowthorp | 200/5 A |
| 4,127,758 | 11/1978 | Lowthorp | 200/340 |
| 4,263,485 | 4/1981 | Corwin | 200/159 B |
| 4,268,730 | 5/1981 | Higgins et al. | 178/18 X |

FOREIGN PATENT DOCUMENTS

327722  12/1902  France .............................. 200/159 B

Primary Examiner—Stafford D. Schreyer
Attorney, Agent, or Firm—Louis Etlinger; Wm. F. Porter, Jr.

[57] ABSTRACT

An electronic writing pen which induces electromagnetic signals in conductors which are disposed in a writing table and are connected to digitizer circuitry is disclosed. The pen has a writing cartridge which is movable within the pen housing and includes, in one embodiment, a thin, deformable, stainless steel dome switch element which functions as an electrical contact in a normally-open switch which is utilized to provide an electrical indication of the up/down status of the pen to the digitizer and tactile feel of change of pen position to the pen user. In another embodiment, the switch includes an insulating strip having a conductive layer thereon to provide status indication with low application of force to the pen and without tactile feel.

8 Claims, 7 Drawing Figures

ELECTRONIC PEN WITH SWITCHING MECHANISM FOR SELECTIVELY PROVIDING TACTILE OR NON-TACTILE FEEL

BACKGROUND OF THE INVENTION

This application is a continuation-in-part of U.S. patent application Ser. No. 498,602 filed on May 26, 1983, now abandoned.

1. Field of the Invention

This invention relates to the field of electronic writing instruments and sensors and, in particular, to a simple, reliable, tactile feel electronic pen and to a switching mechanism for an electronic pen which is easily and reliably assembled and selectively provides tactile or non-tactile feel.

2. Description of the Prior Art

Various approaches have been taken to develop an effective method of generating an electrical signal indicative of the position of a writing instrument in relation to a writing surface.

One technique which has been utilized is disclosed in U.S. Pat. No. 4,210,775, which pertains to a digitizer in which an electronic pen has a coil disposed about a nose piece located immediately above the writing pen. The writing pen is positioned above a tablet comprising a grid of conductors, including a group of parallel spaced conductors oriented in an X direction and a group of parallel spaced conductors oriented in a Y direction. The pen tip is moved along a work sheet disposed on a support surface containing the grid of conductors, and an oscillator applies a signal of predetermined constant frequency and amplitude to the coil. The coil is inductively coupled to the conductors of the grid, thereby inducing signals in the conductors, and the grid conductors in each group are sequentially scanned to sequentially couple the induced electromagnetic signals therein to a differential amplifier by means of multiplexing circuitry in the digitizer. Other techniques utilize electrostatic coupling between the pen and the writing surface.

Electronic pens utilized in connection with such digitizing equipment often have writing cartridges which are movable between upper and lower positions within the pen housing to effect switching which provides electrical output signals indicative of the up/down status of the pen. For example, in certain modes of operation, it may be desired for the digitizing equipment to provide output signals corresponding to pen location only when the pen housing is pressed down relative to the cartridge.

One such pen is described in Rogers, et al., U.S. Pat. No. 3,886,311. The Rogers pen includes a single pole, single throw, mechanical push-button switch which is threaded into the inner cavity of the pen so that the blunt end of the ballpoint pen cartridge used in the pen is positioned near the extremity of the push-button. Thus, the switch is actuated when the pen cartridge is inwardly displaced a distance greater than the sum of travel required for actuation of the switch and the gap distance maintained between the cartridge end and the push-button extremity.

Muller, et al, U.S. Pat. No. 4,034,155, discloses a pen which has a somewhat simpler on-off switching mechanism in which a light source and light detecting circuitry are utilized so that when a shaft slides axially inward and interrupts the passage of light from the light source to the detecting circuitry, the interruption of the light will provide an electrical signal indicating that the sensing pen is being used.

Both the Rogers, et al., and Muller, et al., pens have a common shortcoming in their lack of a simple, effective, and highly reliable, low-cost switching mechanism wherein the switching mechanism may be easily assembled and installed and the pen may be moved between upper and lower positions to provide a signal indicative of the up/down status of the pen and provide the desired tactile feel to the user.

Accordingly, it is an object of the present invention to provide an improved, simple, low-cost, reliable and relatively long-lived switching mechanism in an electronic pen for indicating the up/down status of the pen.

Another object of the present invention is to provide such an electronic pen switching mechanism which produces a suitable tactile feel, if desired, when the pen is moved between upper and lower positions and does not require excessive force in its switching operation.

It is a further object of the present invention to provide such a switching mechanism which may be assembled simply and reliably inserted in place in the pen housing.

SUMMARY OF THE INVENTION

An electronic writing pen for electromagnetically inducing signals in conductors in a writing table for a digitizer is disclosed. The pen has a cartridge movable within a housing to provide up/down positions for the pen and has status circuitry for indicating the up/down status of the pen to microprocessor circuitry in a digitizer. The status circuitry includes a normally-open switch which, in one embodiment of the switching mechanism, includes a thin, conductive, convex dome element which functions as a movable contact in the switch. Movement of the cartridge within the housing urges a plunger against the dome element, and the dome element is snapped into a concave configuration to effect electrical contact with a stationary contact and imparts a mechanical snapping action to the housing to provide tactile feel to the pen user.

The normally-open switch includes a tubular central electrode, an intermediate annular insulator and an outer annular electrode which may be press-fit together, and the dome element is seated in a recess in an end surface of the outer annular electrode, spaced apart from a portion of the central electrode, and the entire switch assembly is snap-fit between a pair of deformable ribs on an inner housing with the dome element held in place by a rigid rib on the inner housing adjacent the end of the plunger.

In another embodiment of the switching mechanism, the movable element of the switch includes a thin deformable Mylar strip, having a layer of conductive ink baked on the side facing the stationary contact element and contacting portions of the outer annular electrode, in place of the convex dome element. Movement of the plunger within the housing deforms the conductive ink-mylar laminate into effective electrical contact with the central electrode.

Other objects, features, and advantages of the present invention will become apparent from the following description of a preferred embodiment thereof, taken together with the attached drawings.

Figure 1:
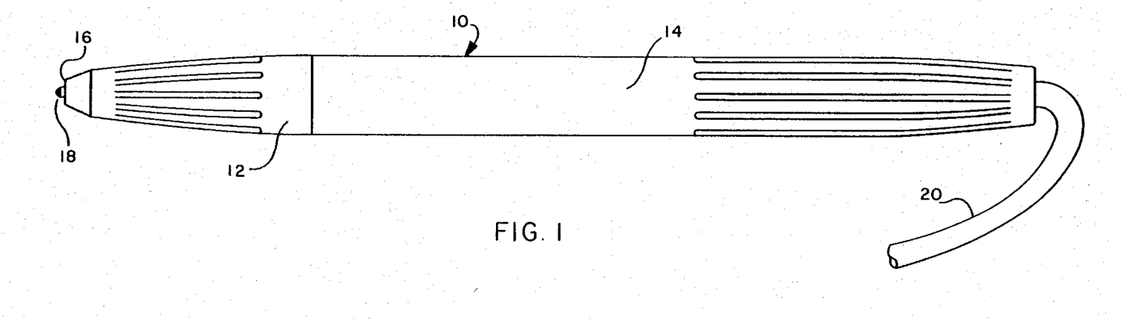
FIG. 1 is a perspective view of an electronic pen constructed in accordance with the present invention.

Referring now to FIG. 1, there is shown an electronic writing pen, generally designated 10, which is constructed from a suitable lightweight non-conductive material, such as plastic. The writing pen 10 has a lower outer housing 12 and an upper outer housing 14 secured to each other by threads or other suitable means (not shown), and the lower housing 12 has a lower end aperture 16 therein through which the tip 18 of the writing pen extends. Shielded cabling 20 is shown extending from an end opening in the upper outer housing 14 and contains suitable circuitry for energizing the coil in writing pen 10 and for providing an indication of the up/down status of the pen 10, as will be explained in greater detail below.

Figure 2:
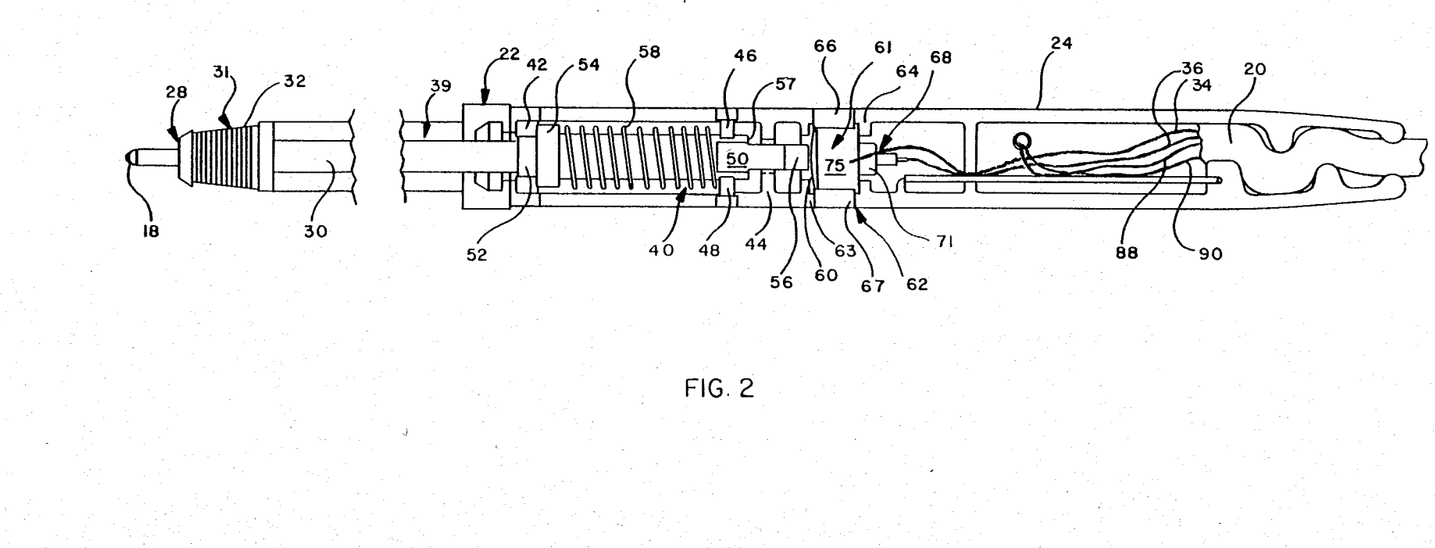
FIG. 2 is a view in side elevation showing the pen inner housing and the components mounted thereon.

Referring to FIG. 2, the inner housing 22 of the writing pen 10, which is proportioned to fit snugly inside the lower end upper outer housings 12 and 14 when the latter housings are secured, is shown. The inner housing 22 also is constructed from plastic or other suitable, light-weight, non-conductive material, has a body 24 which is generally semicircular in cross-section and an open irregular front opening, generally designated 26 (and defining a plurality of cavities described in greater detail below), extending substantially the entire length of the inner housing 22. The inner housing 22 has an annular closed portion at its lower end defining a generally circular front aperture 28 for receiving a pen cartridge 30 and an outer annular recess 31 having a nonmetallic base around which a coil 32 of wire is wound.

The input leads 34 and 36 from an oscillator in a digitizer which power the coil 32 extend from the shielded cable 20 through an opening 38 in the rear wall of the inner housing 22 along a recessed groove (not shown) to the coil 32.

A lower cavity 39, communicating with the aperture 28, is provided in the inner housing 22 and is arranged to receive the generally tubular writing cartridge 30 through the aperture 28. An intermediate plunger-receiving cavity 40 is defined in the inner housing 22 by rigid annular ribs 42 and 44 which are integral with the inner surface of the housing 22 and extend radially inwardly therefrom. A pair of spaced-apart deformable ribs 46 and 48 are formed separately, extending from the walls of the inner housing and integral therewith between the annular ribs 42 and 44.

A plastic plunger 50 having an annular collar 52, for receiving the upper end of the cartridge 30, at its lower end and an annular outer rib 54 defining a stop (against the rib 42) adjacent the collar 52 has a tubular upper end portion 56 (0.93" in diameter) defining a deflection mechanism extending upwardly from a shoulder 57 which defines an upper stop (against the rib 44). A compression spring 58 is carried on the plunger 50 above the collar 54, and the plunger 50 is proportioned to permit the plunger to be snap-fit between the deformable ribs 46 and 48 with the collar 54 normally urged against the lower rib 42 by the spring 58 and the upper surface of the shoulder 57 spaced 0.014" from the lower surface of the upper rib 44.

Figure 2A:
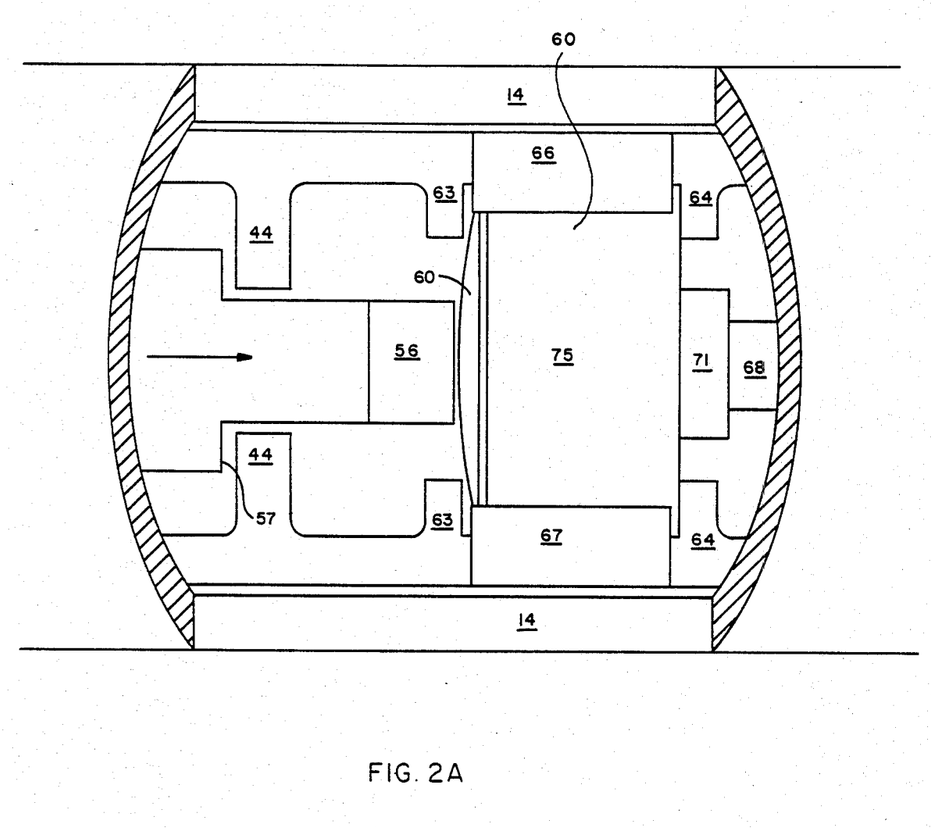
FIG. 2a is an enlarged view, partially broken away, showing portions of the outer and inner housings of the pen.
Figure 3:
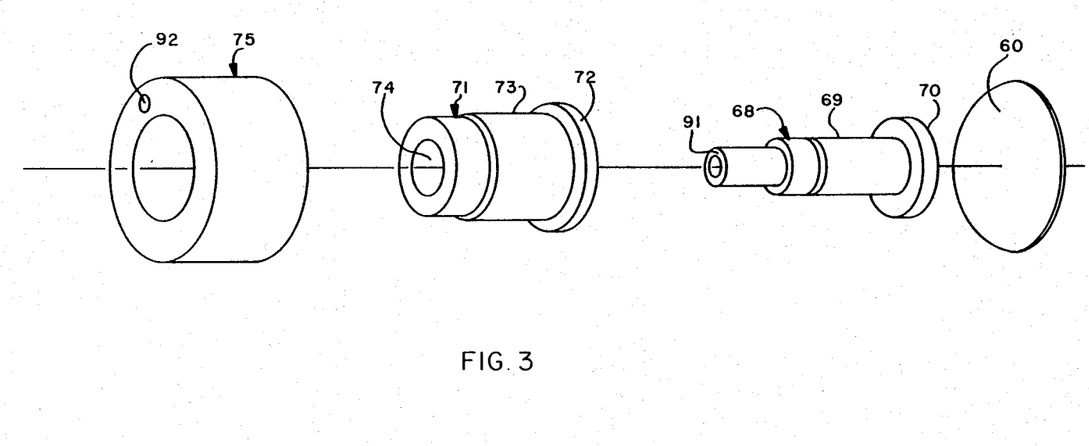
FIG. 3 is a perspective view, showing a switch assembly constructed in accordance with the invention.
Figure 4:
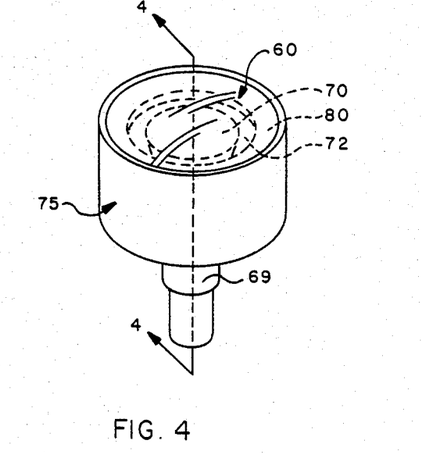
FIG. 4 is a cross-sectional view, taken along line 4—4 in FIG. 3.

As will be explained in greater detail below, when the pen 10 is pushed by the user down toward a surface, the cartridge 30 and plunger 58 are urged upwardly against the force of the compression spring 58, and the upper end portion 56 of the plunger 50 deflects a normally convex dome contact element 60 (see FIGS. 2a and 3) which define a portion of a switch 61 disposed in a switch-receiving chamber, generally designated 62, immediately above a rigid rib 63 which extends radially inwardly from the inner housing 22.

The switch-receiving chamber 62 is defined in the housing 22 by the upper surface of the rib 64, by the lower surface of a radially inwardly extending rigid annular rib 64 integral with the wall of the housing 22 and by a pair of deformable ribs 66 and 67 spaced apart from and between the ribs 63 and 64 and extending from the wall of the inner housing 22.

Referring now to FIGS. 2a, 3, 4 and 5, the construction, assembly and operation of the status indication switching mechanism of the present invention will be explained. The switch assembly 61 has a tubular inner contact electrode 68 (0.375" long and constructed of gold-flashed brass) having a main shaft 69 with an outer diameter of 0.095" and having an upper flange 70 (0.160" in diameter and 0.02" long) extending radially outwardly at one end thereof. A generally annular insulator 71 (¼" long) constructed of plastic or other suitable non-conductive material, has an upper flange 72 (0.04" long and 0.215" in diameter) at one end thereof, a main body portion 73 with an outer diameter of 0.173" and an opening 74 extending therethrough, having an inner diameter of 0.094". An outer annular electrode 75 (0.190" long and constructed of gold-plated brass) is provided and has a stepped opening generally designated 76 extending therethrough, including (See FIG. 5) a first tubular opening 77 with an inner diameter of 0.172", a second stepped tubular opening 78, having an inner diameter of 0.220", and a third stepped tubular opening 79 defining a recess 80, with an inner diameter of 0.280" and a depth of 0.01" extending to the upper surface 82 of the electrode 75.

Figure 5:
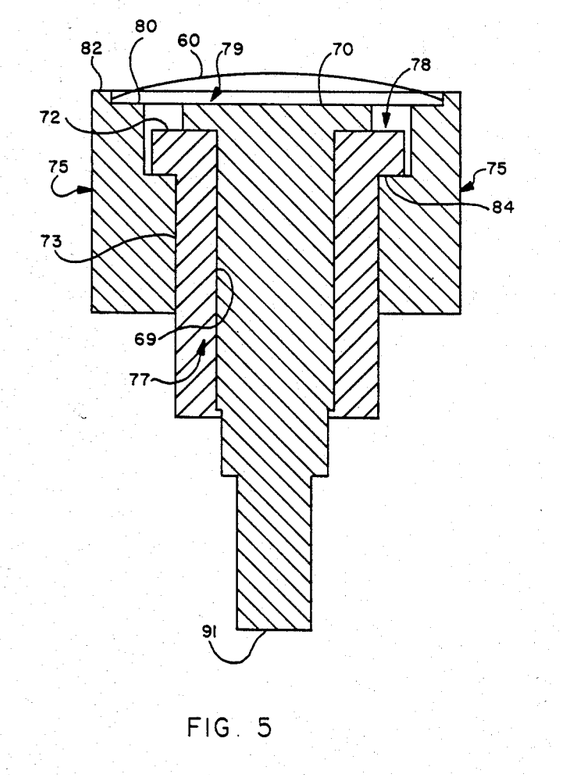
FIG. 5 is an exploded perspective view of the individual component parts of the switch assembly shown in FIGS. 3 and 4.

As can be readily appreciated, the inner tubular electrode 68 can be press-fit in the opening 74 through the annular insulator 71, and the annular insulator 71 then press-fit through the openings 77 and 78 in the outer annular electrode 75 with the flange 70 of the inner electrode 68 seated on a shoulder 84 defined by the opening 78 in the outer electrode 75. The annular rib 82 and the flange 70 of the inner contact 68 then define the recess 80. The stainless steel dome 60 (0.003" thick with an outer diameter of 0.270") is seated in the recess 80 and functions as a switching element.

When the electrodes 68 and 75 and insulator 71 are press-fit together and the dome element 60 seated in the recess 80, the entire switch assembly 61 may be snap-fit in the switch-receiving chamber 62 between the deformable ribs 66 and 67, and the ribs 63 and 64 with the rib 63 at the lower end of the chamber 62 holding the stainless steel dome element 60 in place. Output leads 88 and 90 are soldered to the lower end surface 91 of the tubular electrode 68 and a cavity 92 in the outer surface of the outer electrode 75 and are connected (typically through a pick-up resistor and a ground connection) via the shielded cable 20 to pen status detecting circuitry (not shown) in the digitizer.

For assembly of the pen 10, the plunger 50 carrying the compression spring 58 is snap-fit in the plunger-receiving chamber 40, and the elements of the switch assembly 61 are snap-fit in the switch receiving chamber 62 with the output leads 34, 36, 88 and 90 suitably connected to the shielded cable 20. The cartridge 30 is inserted via the aperture 28 and cavity 39 into the collar 52 in the plunger 50. The lower outer housing 12 and upper outer housing 14 are secured to each other around (and with positions of housings 12 and 14 engaging) the inner housing 22, and the pen 10 may be operated.

After the pen 10 is assembled, the upper surface 56 of the plunger is normally spaced 0.010" from the surface of the convex element 60. When the pen tip 18 engages a writing surface and the outer housing is pressed down further by the pen user, the cartridge 30 urges the plunger 50 upwardly 0.014" until the shoulder 57 engages the lower surface of the rib 44, the upper edge 56 of the plunger deflects the convex dome 60 toward the central flange 70 of the contact element 68 until a portion of the dome element snaps, imparting a pronounced tactile feel thereof via the inner and outer housings to the pen user, and the portion of the dome element is deformed into a concave configuration making effective electrical contact with the central flange 70.

When the pen 10 is released by the user, the plunger 50 and cartridge 30 are returned to their original positions by the spring 58, and the dome 60 snaps back to its original convex position, opening the switch mechanism 61 and providing tactile feel thereof to the user. The signal on lines 88 and 90 now indicates that the pen is in its up position.

In the switching operations, the only moving part in the switch 61 is the dome 60, thus reducing the possibility of wear and breakdown. The solder connections to leads 88 and 90 remain stationary. The specification for the dome 60 shown indicates a life test of 3 million switching operations.

It has been found that, with the dome element 60 shown, by providing the plunger 50 with an end 56 having a diameter of 0.097", the force required to push the pen down is approximately 150 grams which is desirable for tactile operations. If the plunger end 56 is wider, the force required to depress the pen 10 becomes undesirably high; as the diameter of the plunger end 56 is decreased below 0.097", the life of the dome 60 rapidly decreases to approximately one-half the otherwise obtainable life. Such a switching mechanism may also be utilized in pens which have electrostatic coupling or in other mechanisms, for example, those which operate with optical sensor or indicators rather than mechanical cartridges.

Figure 6:
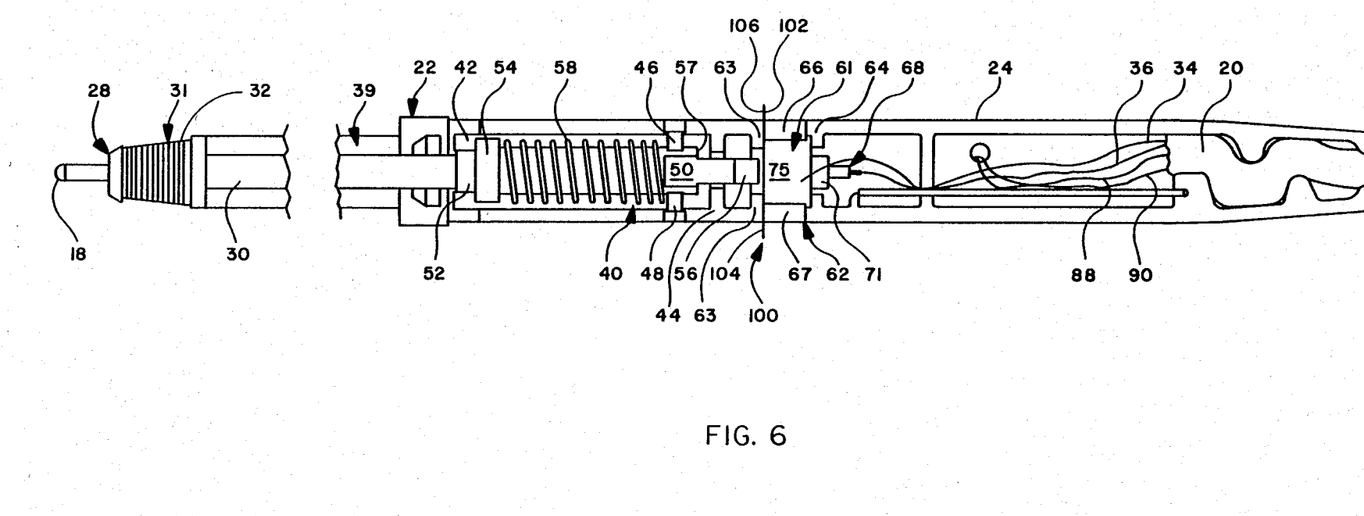
FIG. 6 is a view, in the side elevation, of an alternative embodiment of the pen of FIGS. 2–5.

An alternative embodiment of the pen switching mechanism of FIGS. 2-5 is shown in FIG. 6. In the embodiment of FIG. 6, the dome element 60 of FIGS. 2-5 is replaced by a thin Mylar strip 100 (0.875" long and 0.005×0.07 wide thick) which has MAG-4366 conductive epoxy ink (baked at approximately 230° F. for seventy minutes) approximately 0.0005" thick, on the surface 102 facing the switch assembly 61. When the switch assembly 61 is snap-fit between ribs 66, 67, the Mylar strip 100 is press-fit between rib 63 and ribs 66, 67, and the conductive epoxy ink is in effective electrical contact with portions of the upper surface 82 of the outer electrode 75. End tabs 104, 106 of the Mylar strip 100 extend outwardly of the inner housing 24 and are urged against the outer surface of the inner housing 24 in the direction of the pen tip 18 by the upper outer housing 14 when assembled to the outer lower housing 12.

The embodiment of FIG. 6 thus also provides a switch mechanism which is inexpensive and may be simply snap-fit in inner housing 24. This mechanism eliminates tactile feel (which is not desired in certain applications) and permits as little as about 30 milligrams of force applied to the pen housing 24 by the user to move the pen cartridge 30 and plunger 50 within the housing 24 so that the upper surface 56 of the plunger deforms the Mylar strip 100 a sufficient distance for the conductive epoxy ink on surface 102 to make effective electrical contact with the central flange 70 of the contact element 68. A switching mechanism constructed in accordance with FIG. 6 also provides high reliability and relatively long life. Life testing currently being conducted has exceeded 8.4 million operations without failure of the switching mechanism.

While the invention has been described with reference to a particular preferred embodiment thereof, it will be apparent to those skilled in the art that various modifications may be made therein in form and detail without departing from the spirit and scope of the appended claims.

What is claimed is:

1. In an electronic pen comprising:
   a housing having a wall with an aperture extending therethrough,
   a cartridge including a pen tip extending through the aperture outwardly of the housing, the cartridge being movable within the housing between a first position in which the pen has a first status and a second position in which the pen has a second status,
   status indication circuit means including switching means for providing a first status signal when the pen has its first status and a second status signal when the pen has its second status,
   the improvement wherein the switching means comprises a normally-open switch including a stationary electrical contact connected to a first output lead, an electrically conductive, relatively thin convex dome mounted within the housing adjacent and generally surrounding one portion of the stationary electrical contact, and
   deflection means responsive to movement of the carriage from the first position to the second position for snapping a first portion of the dome into a concave configuration into effective electrical contact with the stationary contact to close the normally-open switch and substantially simultaneously therewith to transmit a detectable mechanical snapping action to the housing, a second portion of the dome being connected to a second output lead and remaining stationary when the dome portion is being snapped into contact with the stationary contact, whereby switching operations occur without movement of the first or second output leads.

2. The pen of claim 1 wherein the dome has a generally semicircular cross-section.

3. The pen of claim 2 wherein the dome is fabricated from stainless steel and the thickness of the dome is of the order of 0.003".

4. The pen of claim 2 wherein the deflection means comprises a plunger, having a circular cross-section, mounted on the cartridge adjacent a central convex portion of the dome and the plunger deflects the central convex portion of the dome into effective electrical contact with the stationary electrical contact.

5. The pen of claim 4 wherein the diameter of the dome is of the order of 0.270" and the diameter of the plunger is of the order of 0.097".

6. In a pen comprising:
   a housing having a wall with an aperture extending therethrough,
   a cartridge including a pen tip extending through the aperture outwardly of the housing, the cartridge being movable within the housing between a first position in which the pen has a first status and a second position in which the pen has a second status,
   status indication circuit means including switching means for providing a first status signal when the pen has its first status and a second status signal when the pen has its second status,
   the improvement wherein the switching means comprises:
   a first, generally tubular, stationary electrical contact, connected to a first output lead,
   an annular insulator disposed around the first contact and
   a second, generally annular, electrical contact having an inner opening extending therethrough for engagingly receiving into one surface of the second electrical contact the annular insulator disposed around the first electrical contact and having a recess in the one surface which has a diameter which is greater than the outer diameter of the insulator and which defines a collar at the periphery of the one surface of the second electrical contact,
   a relatively thin, electrically conductive, semicircular convex dome element having a stationary portion connected to a second output lead, seated within the recess and a central portion spaced apart from the first electrical contact, and
   deflection means responsive to movement of the cartridge from the first position to the second position for snapping the central portion of the dome element into a concave configuration to effect effective electrical contact with the first electrical contact while both the first and the second output lead remains stationary.

7. The pen of claim 6 further comprising a non-conductive inner housing for supporting the cartridge, the inner housing having deformable rib portions extending therefrom adjacent a rigid rib portion whereby the second contact, with the insulator and first contact inserted therein and the dome element seated in the recess, may be snap-fit in the inner housing between the deformable rib portions with the dome element held in the recess by the rigid rib portion.

8. The pen of claim 6 further comprising an inner housing for supporting the cartridge, the switching means and the deflection means, the inner housing having:
   a generally semicircular wall,
   an opening extending along an inner face of the wall,
   deformable rib portions, spaced apart by a distance which is less than the outer diameter of the second contact, extending from top and bottom portions of the wall, and
   rigid front and rear ribs extending inwardly into the housing to the front and rear, respectively of the deformable rib portions and having corresponding facing surfaces spaced apart by a distance which is slightly greater than the length of the second electrical contact, whereby the second contact with the first contact and insulator inserted therethrough and the dome element disposed in the recess may be snap-fit between the deformable rib portions with the dome held in the recess adjacent the deflection means by one of the front and rear ribs.

* * * * *

UNITED STATES PATENT OFFICE
CERTIFICATE OF CORRECTION

PATENT NO. : 4,532,376
DATED : July 30, 1985
INVENTOR(S) : Lynn Harlow Rockwell

It is certified that error appears in the above-identified patent and that said Letters Patent are hereby corrected as shown below:

Cover page, change "Nashua, N.J." to --Nashua, N.H.--

Column 4, Line 21 change "64" to --63--

Signed and Sealed this

First Day of October 1985

[SEAL]

Attest:

DONALD J. QUIGG

Attesting Officer

Commissioner of Patents and
Trademarks—Designate